(12) United States Patent
Park et al.

(10) Patent No.: US 10,316,145 B2
(45) Date of Patent: Jun. 11, 2019

(54) POLYAMIC ACID COMPOSITION, POLYAMIDEIMIDE FILM THEREOF AND METHOD FOR PREPARING POLYAMIDEIMIDE FILM

(71) Applicant: SK Innovation Co., Ltd., Seoul (KR)

(72) Inventors: Sang Yoon Park, Daejeon (KR); Hyeon Jeong Kim, Daejeon (KR); Jin Hyung Park, Daejeon (KR); Tae Sug Jang, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 14 days.

(21) Appl. No.: 15/592,550

(22) Filed: May 11, 2017

(65) Prior Publication Data
US 2017/0335063 A1 Nov. 23, 2017

(30) Foreign Application Priority Data

May 20, 2016 (KR) .................. 10-2016-0061797
Apr. 27, 2017 (KR) .................. 10-2017-0054484

(51) Int. Cl.
| | |
|---|---|
| *C08G 73/14* | (2006.01) |
| *C08G 73/10* | (2006.01) |
| *C08L 79/08* | (2006.01) |
| *C08J 5/18* | (2006.01) |

(52) U.S. Cl.
CPC ..... *C08G 73/1078* (2013.01); *C08G 73/1007* (2013.01); *C08G 73/14* (2013.01); *C08J 5/18* (2013.01); *C08L 79/08* (2013.01); *C08J 2379/08* (2013.01)

(58) Field of Classification Search
CPC .. C08J 2379/08; C08G 73/01; C08G 73/1007; C08G 73/1042; C08G 73/14; C08L 79/08
See application file for complete search history.

(56) References Cited

U.S. PATENT DOCUMENTS

| | | | |
|---|---|---|---|
| 2012/0296050 A1* | 11/2012 | Cho ................. | C08G 73/14 |
| | | | 525/436 |
| 2016/0319076 A1* | 11/2016 | Ju ...................... | C08J 5/18 |

FOREIGN PATENT DOCUMENTS

JP 2002161136 6/2002

\* cited by examiner

*Primary Examiner* — Gregory Listvoyb
(74) *Attorney, Agent, or Firm* — The Webb Law Firm

(57) ABSTRACT

Provided are a polyamic acid composition, a polyamideimide film thereof, and a method for preparing the polyamideimide film. More specifically, provided are a polyamideimide film capable of implementing excellent optical properties in addition to inherent physical properties of polyimide by using a polyamic acid composition including a combination of specific components, and a method for preparing the polyamideimide film.

11 Claims, No Drawings

POLYAMIC ACID COMPOSITION, POLYAMIDEIMIDE FILM THEREOF AND METHOD FOR PREPARING POLYAMIDEIMIDE FILM

CROSS-REFERENCE TO RELATED APPLICATIONS

This application claims priority to Korean Patent Application Nos. 10-2016-0061797 and 10-2017-0054484, filed May 20, 2016, and Apr. 27, 2017, respectively, the disclosures of which are hereby incorporated in their entirety by reference.

TECHNICAL FIELD

The following disclosure relates to a polyamic acid composition, a polyamideimide film thereof, and a method for preparing the polyamideimide film. More specifically, the following disclosure relates to a polyamideimide film capable of implementing excellent optical properties including inherent physical properties of polyimide by using a polyamic acid composition including a combination of specific components, and a method for preparing the polyamideimide film.

BACKGROUND

In general, polyimide is applied to various fields including insulating substrates for forming circuits and devices due to excellent mechanical and heat properties. However, since a charge transfer complex is formed between aromatic rings during polymerization, the polyimide is colored with brown or yellow color, and thus, a transmittance in a visible light region is low, which has difficulty in being applied to display materials.

As a method of preparing the polyimide to be colorless and transparent, a method of suppressing formation of the charge transfer complex in a molecule by using alicyclic diamine or an aliphatic diamine as a diamine component has been known. Japanese Patent Laid-Open Publication No. 2002-161136 (Patent Document 1) discloses polyimide obtained by imidizing a polyimide precursor formed with an aromatic acid dianhydride such as pyromellitic dianhydride, etc., and trans-1,4-diaminocyclohexane. The polyimide exhibits high transparency, but has a problem in that mechanical properties are deteriorated. That is, it has been known to use various functional monomers as a method for converting the yellow color of polyimide to be colorless and transparent, but there is still a problem in that inherent and excellent mechanical properties are deteriorated. In addition, the transmittance of the transparent polyimide is high at a long wavelength (that is, higher than 450 nm). On the contrary, the transmittance of the transparent polyimide is rapidly reduced at a short wavelength (that is, lower than 450 nm).

Meanwhile, a scope at which display materials are applied has been diversified according to development of various electronic devices, and research and development for replacing a cover glass for display with a polymer material are actively progressing. Therefore, it is required to develop technologies for improving optical and surface properties simultaneously while implementing inherent and excellent physical properties of polyimide in various display material fields including materials for replacing the cover glass.

RELATED ART DOCUMENT (Patent Document 1) Japanese Patent Laid-Open Publication No. 2002-161136 (Jun. 4, 2002)

SUMMARY

An embodiment of the present disclosure is directed to providing a polyamic acid composition capable of having inherent and excellent mechanical properties of polyimide and high light transmittance, particularly, improved transmittance over an entire visible light wavelength region and implementing a low Yellow index.

Another embodiment of the present disclosure is directed to providing a polyamideimide film having excellent light transmittance and surface properties by using the above-described polyamic acid composition.

In one general aspect, there is provided a polyamic acid composition including a polyamic acid resin derived from 2,2'-bis(trifluoromethyl)benzidine (TFMB), cyclic aliphatic dianhydride, and aromatic diacid dichloride.

The cyclic aliphatic dianhydride may be cyclobutane tetracarboxylic dianhydride.

The aromatic diacid dichloride may be any one selected from the group consisting of isophthaloyl dichloride, terephthaloyl dichloride, 1,3-adamantanedicarbonyl dichloride, 1,4-naphthalene dicarboxylic dichloride, 2,6-naphthalenedicarboxylic dichloride, and 1,5-naphthalenedicarboxylic dichloride, or a mixture of two or more thereof.

The aromatic diacid dichloride may have a content of 40 to moles with respect to 100 moles of the 2,2'-bis(trifluoromethyl)benzidine.

The polyamic acid composition may have a viscosity of 4,000 to 500,000 cps as measured at 25° C.

In another general aspect, there is provided a polyamideimide film derived from 2,2'-bis(trifluoromethyl)benzidine, cyclic aliphatic dianhydride, and aromatic diacid dichloride, and satisfying Equation 1 below:

$$(Tr\_400 \text{ nm}/Tr\_550 \text{ nm}) \geq 0.96 \qquad [\text{Equation 1}]$$

wherein Equation 1 represents a transmittance ratio of a transmittance in a light having a wavelength of 400 nm to a transmittance in a light having a wavelength of 550 nm, $Tr\_400$ nm is a transmittance at 400 nm, and $Tr\_550$ nm is a transmittance at 550 nm.

The transmittance at 400 nm of the polyamideimide film may be 85% or more.

The polyamideimide film may have a Yellow index of 2.4 or less.

The cyclic aliphatic dianhydride may be cyclobutane tetracarboxylic dianhydride, and the aromatic diacid dichloride may be isophthaloyl dichloride.

The isophthaloyl dichloride may have a content of 40 to 90 moles with respect to 100 moles of the 2,2'-bis(trifluoromethyl)benzidine.

In another general aspect, there is provided a method for preparing a polyamideimide film including: (a) dissolving 2,2'-bis(trifluoromethyl)benzidine in an organic solvent, and then reacting cyclic aliphatic dianhydride to prepare an oligoamic acid solution, (b) adding an aromatic diacid dichloride to the oligoamic acid solution, followed by reacting, thereby preparing a polyamic acid composition, and (c) applying the polyamic acid composition and performing imidization.

The imidization in (c) may be performed by a stepwise heat treatment at 50 to 350° C.

The stepwise heat treatment may be performed by performing a primary heat treatment at 50 to 150° C., a secondary heat treatment at 150 to 250° C., and a tertiary heat treatment at 250 to 350° C.

In addition, the heat treatment may be performed under an inert gas atmosphere, preferably a nitrogen reflux atmosphere.

The polyamic acid composition in (c) may further include any one selected from a dehydrating agent and an imidization catalyst, or a mixture thereof.

DETAILED DESCRIPTION OF EMBODIMENTS

Hereinafter, a polyamic acid composition according to the present disclosure, a polyamideimide film thereof, and a method for preparing the polyamideimide film are described in detail with reference to preferred embodiments. However, they are not intended to limit the protective scope defined by the claims of the present disclosure. Here, unless technical and scientific terms used herein are defined otherwise, they have meanings understood by those skilled in the art to which the present disclosure pertains.

In addition, unless explicitly described to the contrary, the term "comprise" and variations such as "comprises" or "comprising" will be understood to further include other elements rather than excluding other elements throughout the specification.

The present inventors surprisingly found that when a polyamic acid composition including 2,2'-bis(trifluoromethyl)benzidine, cyclic aliphatic dianhydride, and aromatic diacid dichloride, that is, derived from specific diamine, dianhydride, and aromatic diacid was used, it was possible to remarkably reduce a Yellow index, to increase light transmittance throughout a visible light region, thereby improving optical properties, while simultaneously implementing excellent surface hardness, and completed the present disclosure.

Specifically, the present disclosure provides a polyamic acid composition including specific diamine, cyclic aliphatic dianhydride, and aromatic diacid dichloride, and a polyimide film using the polyamic acid composition in order to provide a resin and a film that are able to be applied to various display fields by improving optical properties as well as inherent mechanical and heat properties of polyimide.

The specific diamine is an aromatic diamine into which a fluorine substituent is introduced, and is characterized by being 2,2'-bis(trifluoromethyl)benzidine. Accordingly, it is possible to provide excellent optical properties due to a charge transfer effect of fluorine substituents, and further, it is possible to provide a polyamideimide resin which is an imide of the polyamic acid composition in combination of the 2,2'-bis(trifluoromethyl)benzidine with the cyclic aliphatic dianhydride and the aromatic diacid dichloride, thereby improving desired optical properties and implementing excellent mechanical properties such as surface hardness, etc.

Here, when the 2,2'-bis(trifluoromethyl)benzidine is used alone as the diamine component of the polyamic acid composition, it is more preferred to implement an effect to be achieved as compared to when the 2,2'-bis(trifluoromethyl)benzidine is mixed with other known aromatic diamine components.

In the present disclosure, the cyclic aliphatic dianhydride is differentiated from an aromatic dianhydride. That is, it is difficult to achieve a desired effect when the dianhydride used in the present disclosure is used together with the aromatic dianhydride, and it is possible to implement a synergistic effect of desired physical properties, including increasing light transmittance through combination with other components in the composition by using the cyclic aliphatic dianhydride.

The cyclic aliphatic dianhydride is not largely limited, but may be, for example, any one selected from the group consisting of 1,2,3,4-cyclobutane tetracarboxylic dianhydride (CBDA), 5-(2,5-dioxotetrahydrofuryl)-3-methylcyclohexene-1,2-dicarboxylic dianhydride (DOCDA), bicyclooctene-2,3,5,6-tetracarboxylic dianhydride (BODA), 1,2,3,4-cyclopentane tetracarboxylic dianhydride (CPDA), 1,2,4,5-cyclohexane tetracarboxylic dianhydride (CHDA), 1,2,4-tricarboxy-3-methylcarboxycyclopentane dianhydride, and 1,2,3,4-tetracarboxycyclopentane dianhydride, or a mixture of two or more thereof. More preferably, the cyclobutane tetracarboxylic dianhydride is more preferred since it is possible to implement desired effects, that is, a low Yellow index and improved light transmittance over the entire wavelength region.

A content of the cyclic aliphatic dianhydride is not limited, but may be 1 to 90 moles, more specifically 10 to 70 moles, with respect to 100 moles of 2,2'-bis(trifluoromethyl)benzidine (TFMB). Within the above-described range, it is sufficient to implement light transmittance at the desired range.

In the present disclosure, the aromatic diacid dichloride reacts with the 2,2'-bis (trifluoromethyl)benzidine to form an amide structure in a polymer chain, which may improve mechanical properties including surface hardness. The aromatic diacid dichloride is not largely limited, but may be, for example, any one selected from the group consisting of isophthaloyl dichloride (IPC), terephthaloyl dichloride (TPC), 1,3-adamantanedicarbonyl dichloride, 1,4-naphthalene dicarboxylic dichloride, 2,6-naphthalene dicarboxylic dichloride, and 1,5-naphthalene dicarboxylic dichloride, etc., or a mixture of two or more thereof.

Further, the aromatic diacid dichloride is not limited to the above-exemplified compounds, and may be further used by mixing with other acid halide compounds, but it is preferred to use the aromatic diacid dichloride alone. More preferably, isophthaloyl dichloride is used alone since it is possible to simultaneously improve the transmittance at a short wavelength and the Yellow index. Otherwise, the isophthaloyl dichloride and terephthaloyl dichloride may be mixed to be used.

Here, the aromatic diacid dichloride may have a content of 40 to 90 moles, preferably, 50 to 90 moles, and more preferably, to 80 moles with respect to 100 moles of the 2,2'-bis(trifluoromethyl)benzidine (TFMB). When the above-described range is satisfied, high transmittance may be implemented not only at a long wavelength but also at a short wavelength, without deteriorating desired balance of physical properties, that is, mechanical and heat properties, in combination with other components. In particular, when the content of the aromatic diacid dichloride is 60 to 80 moles with respect to 100 moles of TFMB, the high transmittance in the entire visible light region may be implemented while simultaneously further reducing the Yellow index, thereby implementing a synergistic effect of excellent optical properties.

An equivalence ratio of a mixture of the 2,2'-bis(trifluoromethyl)benzidine, the cyclic aliphatic dianhydride, and the aromatic diacid dichloride in the present disclosure is preferably 0.9:1 to 1.1:1, and more preferably, 1:1. It is preferred to satisfy the above-described range in consideration of the physical properties of the film including film-forming properties at the time of casting and molding the film using the polyamic acid composition including the monomers.

The polyamic acid composition in the present disclosure is a solution of a polyamic acid resin derived from the above-described monomers, and includes an organic solvent for solution polymerization of the above-described monomers to obtain the polyamic acid resin. The organic solvent may be used without significant limitation as long as it is a solvent dissolving polyamic acid. For example, polar solvents such as dimethylacetamide (DMAc), N-methyl-2-pyrrolidone (NMP), dimethylformamide (DMF), dimethylformsulfoxide (DMSO), acetone, diethyl acetate, and m-cresol, etc., may be used alone, or may be used by mixing two or more thereof. Further, a moisture content remaining in the solvent is preferably 1,000 ppm or less since it is possible to prevent deterioration of the physical properties. More preferably, the moisture content is 100 ppm or less.

The content of the solvent is not largely limited, but is suitably 70 to 98 wt %, preferably 75 to 95 wt %, and more preferably, 80 to 90 wt %, in the entire composition in view of a viscosity of the polyamic acid composition including the polyamideimide resin obtained by copolymerization.

A preferable embodiment of the polyamic acid composition in the present disclosure may include a polyamic acid resin derived from 2,2'-bis(trifluoromethyl)benzidine, cyclobutane tetracarboxylic dianhydride, isophthaloyl dichloride, and an organic solvent, and it is significantly effective since it is possible to implement excellent physical properties including not only mechanical and heat properties but also optical properties and simultaneously surface hardness by the combination.

The polyamic acid composition according to the present disclosure may have a viscosity of 4,000 to 500,000 cps, preferably 5,000 to 300,000 cps, and more preferably 5,000 to 200,000 cps, as measured at 25° C. using a Brookfield viscometer. When the above-described range is satisfied, coating property at the time of forming the film may be excellent, and thus, castability may be secured, and it is more preferred in view of mechanical properties including transmittance and surface hardness.

The polyamic acid composition according to the present disclosure may further include any one or more selected from an imidization catalyst and a dehydrating agent in addition to the polyamic acid. The imidization catalyst and the dehydrating agent are not limited as long as they are generally used in the art. More specifically, for example, the imidization catalyst may be any one selected from pyridine, isoquinoline, and β-quinoline, or a mixture of two or more thereof. In addition, the dehydrating agent may be any one selected from acetic anhydride, phthalic anhydride, and maleic anhydride, or a mixture of two or more thereof, but is not necessarily limited thereto.

According to the present disclosure, the polyamideimide resin may be obtained by imidizing the above-described polyamic acid composition. Here, the imidization may be performed by known imidization methods.

Further, the polyamic acid composition according to the present disclosure may further include various types of additives. Examples of the additive may include a flame retardant, an adhesion promoter, an inorganic particle, an antioxidant, a ultraviolet ray inhibitor, a plasticizer, and an antistatic agent, etc., but the additive is not necessarily limited thereto.

In addition, the present disclosure provides a method for preparing a polyamideimide film including:

(a) dissolving 2,2'-bis(trifluoromethyl)benzidine in an organic solvent, and then reacting cyclic aliphatic dianhydride to prepare an oligoamic acid solution, (b) adding an aromatic diacid dichloride to the oligoamic acid solution, followed by reacting, thereby preparing a polyamic acid composition, and (c) applying the polyamic acid composition and performing imidization.

The method for preparing the polyamideimide film is not largely limited, but it is preferably performed by using a reactor equipped with a stirrer, a nitrogen injection device, a dropping device, a thermoregulator, and a cooler.

The preparing of the oligoamic acid solution in step (a) is a step of adding an organic solvent to a reactor, and dissolving 2,2'-bis(trifluoromethyl)benzidine in the reactor, followed by reacting with cyclic aliphatic dianhydride, wherein it is preferred to add monomers to the organic solvent in a stepwise manner rather than adding the monomers to the organic solvent at once since reactivity is able to be increased. Further, first, it is more preferred to sufficiently dissolve 2,2'-bis(trifluoromethyl)benzidine in the organic solvent.

The organic solvent is the same as described above, and preferably, dimethylacetamide or N-methyl-2-pyrrolidone. Further, a content of the organic solvent is not largely limited, but may be appropriately selected in consideration of a molecular weight of the polyamideimide resin obtained by the copolymerization, and may be 70 to 95 wt % of the total composition. Preferably, the content of the organic solvent may be 75 to 95 wt %, and more preferably, 80 to 90 wt %. That is, it is more preferred that the solid content of the organic solvent is 5 to 25 wt %, and more preferably, 10 to 20 wt %.

The oligoamic acid solution may preferably have a viscosity of 10 cps to 5,000 cps as measured at 25° C. using a Brookfield viscometer. More preferably, the viscosity may be 10 cps to 2,000 cps. The above-described viscosity range is preferred since the oligoamic acid may be easily formed, and a viscosity of the final solution is appropriate for capable of forming a polymer suitable for film-forming.

The preparing of the polyamic acid composition in step (b) is a step of obtaining a copolymerized polyamic acid resin by adding an aromatic diacid dichloride to the oligoamic acid solution, followed by reacting. Here, the content of the aromatic diacid dichloride may be controlled to improve optical properties without deteriorating mechanical and heat properties.

The aromatic diacid dichloride may have a content of 40 to 90 moles, preferably, 50 to 90 moles, and more preferably, 60 to moles with respect to 100 moles of the 2,2'-bis(trifluoromethyl)benzidine (TFMB).

In addition, the viscosity of the polyamic acid composition to be finally obtained may be 4,000 to 500,000 cps, preferably, 5,000 to 300,000 cps, and more preferably 5,000 to 200,000 cps. Here, the viscosity is measured at 25° C. using a Brookfield viscometer. When the above-described range is satisfied, coating property at the time of forming the film may be excellent, and thus, castability may be secured, and it is more preferred in view of mechanical properties including transmittance and surface hardness.

The above steps (a) and (b) are performed under an inert gas atmosphere, and for example, are performed while refluxing nitrogen or argon gas in the reactor. In addition, the reaction may be performed at room temperature (20° C.) to 80° C. and for 30 minutes to 24 hours, but the reaction temperature range and the reaction time are not necessarily limited thereto.

The applying of the polyamic acid composition in step (c) may be performed by casting the polyamic acid composition on a support such as a glass substrate, or the like.

The imidization in step (c) is a step of imidizing the polyamic acid composition prepared in step (b) to obtain a polyamideimide resin, wherein known imidization methods, for example, a heat imidization method, a chemical imidization method, and a combination of the heat imidization method and the chemical imidization method may be applied. Preferably, the combination of the chemical imidization method and the heat imidization method may be preferred.

More preferably, the chemical imidization may be performed by adding the dehydrating agent and the imidization catalyst before the heat imidization is performed.

Further, the imidization may be performed before the polyamic acid composition is applied, or may be performed after the polyamic acid composition is applied, and the imidization is not limited since it may be applied by various known methods.

According to a more specific embodiment, the dehydrating agent, the imidization catalyst or a mixture thereof may be added to the polyamic acid composition, and the obtained polyamic acid composition may be applied and heated to perform the imidization, thereby preparing a film, but the present disclosure is not limited thereto.

In an exemplary embodiment of the present disclosure, the chemical imidization may be performed by further adding the dehydrating agent, the imidization catalyst, or a mixture thereof to the prepared polyamic acid composition. When the chemical imidization is performed by adding the dehydrating agent, the imidization catalyst or the mixture thereof to the polyamic acid composition prepared in step (b), it is more preferred in view of physical properties such as elastic modulus, tensile strength, and elongation, etc., of the polyamideimide resin to be obtained.

Specifically, for example, the dehydrating agent and the imidization catalyst may be added to the polyamic acid composition, followed by imidization and purification using a non-solvent, thereby obtaining a solid, and the solid may be dissolved in a solvent to obtain an imidized polyamic acid composition. Next, the imidized polyamic acid composition may be applied and heat-treated to be imidized, thereby preparing a polyamideimide film.

The dehydrating agent is not limited as long as it is generally used, and specifically, for example, may be any one selected from acetic anhydride, phthalic anhydride, maleic anhydride, etc., or a mixture of two or more thereof. The imidization catalyst is not limited as long as it is generally used, and specifically, for example, may be any one selected from pyridine, isoquinoline, β-quinoline, etc., or a mixture of two or more thereof, but is not necessarily limited thereto.

The non-solvent used for the purification is preferably a solvent in which solubility of the polyamic acid or the polyamideimide solid is significantly reduced, and for example, the non-solvent is preferably any one or more selected from water and alcohol.

The solvent used when the imidized polyamic acid is obtained by dissolving the obtained solid in the solvent may be the same as or may be different from the organic solvent used in the preparation of the polyamic acid composition.

The heat imidization method is preferably performed by a stepwise heat treatment. Specifically, for example, the heat imidization may be performed through a stepwise heat treatment while gradually increasing a temperature at a range of 50 to 350° C. More specifically, for example, the heat imidization may be performed by performing a primary heat treatment at 50 to 150° C., a secondary heat treatment at 150 to 250° C., and a tertiary heat treatment at 250 to 350° C., and each step of the primary heat treatment, the secondary heat treatment, and the tertiary heat treatment may have a temperature difference of at least 10° C. or more, specifically, 10 to 150° C. Further, it is preferred that the temperature may be gradually raised at a range of 1 to 20° C./min when moving each step.

More preferably, the stepwise heat treatment is performed by the primary heat treatment at 80 to 100° C., and more specifically, at 90 to 100° C. for 1 minute to 2 hours, the secondary heat treatment at 100 to 200° C., and more specifically, at 150 to 200° C. for 1 minute to 2 hours, and the tertiary heat treatment at 250 to 300° C., and more specifically, at 280 to 300° C. for 1 minute to 2 hours. More preferably, the stepwise heat treatment according to each temperature range is performed for 30 minutes to 2 hours. When the heat treatment is performed at once rather than performing the stepwise heat treatment as described above, the solvent that is not dried may be trapped in the film and may not evaporate even at the time of the high temperature heat treatment, but remain, and thus, it is preferred to dry and imidize the solvent by multi-stage heat treatment.

Here, it is preferred that the stepwise heat treatment is performed by raising a temperature at a range of 1 to 20° C./min when moving each step. In addition, the heat treatment may be performed in a separate vacuum oven, but is not necessarily limited thereto.

The application may be performed to form the film on the support by using an applicator in consideration of a thickness of the film to be prepared.

The polyamideimide resin obtained in the present disclosure may have a weight average molecular weight of 50,000 to 1,000,000 g/mol, preferably 50,000 to 800,000 g/mol, and more preferably 50,000 to 500,000 g/mol. Further, the polyamideimide resin may have a glass transition temperature of 200 to 400° C., and preferably 320 to 380° C.

The present disclosure provides a polyamideimide film prepared by imidizing the above-described polyamic acid composition.

The polyamideimide film may have a thickness of 10 to 100 μm, and preferably 20 to 90 μm, but the thickness thereof is not limited thereto.

Further, the polyamideimide film has a transmittance of 85% or more as measured at 400 nm using a UV-visible spectroscope. Here, the transmittance measured at 400 nm is based on a polyamideimide film having a thickness of 30 μm. Preferably, the transmittance measured at 400 nm based on the polyamideimide film having a thickness of 10 to 100 μm may be 85% or more.

In particular, the polyamideimide film according to the present disclosure has excellent light transmittance throughout the visible light region including not only a long wavelength region but also a short wavelength region. Specifically, the polyamideimide film according to the present disclosure is characterized by satisfying Equation 1 below:

$$(Tr\_400 \text{ nm}/Tr\_550 \text{ nm}) \geq 0.96 \qquad \text{[Equation 1]}$$

wherein Equation 1 represents a transmittance ratio of a transmittance in a light having a wavelength of 400 nm to a transmittance in a light having a wavelength of 550 nm, $Tr\_400$ nm is a transmittance at 400 nm, and $Tr\_550$ nm is a transmittance at 550 nm.

When a value of the transmittance ratio is less than 0.96, it is difficult to achieve the desired effects of physical properties since the transmittance in the short wavelength region is not good.

Further, the polyamideimide film has a Yellow index of 2.4 or less as measured according to ASTM E313. Here, the Yellow index is measured using a Nippon Denshoku 300 instrument.

The present disclosure may produce various types of molded articles by using the above-described polyamic acid composition. For example, the polyamic acid composition may be applied to a printed circuit board including a film, a protective film or an insulating film, a flexible circuit board, etc., but is not limited thereto. Preferably, the polyamic acid composition may be applied to a protective film capable of replacing a cover glass, and thus, may have a wide range of applications in various display fields.

Hereinafter, exemplary embodiments of the present disclosure have been disclosed for illustrative purposes in detail, and thus, the present disclosure is not limited to the following Examples.

Physical properties of the present disclosure were measured as follows.

(1) Weight Average Molecular Weight

The weight average molecular weight was measured on polystyrene used as a standard sample, by using 1260 Infinity from Agilent Technologies. Here, PL gel Olexis was used as a column, and the sample was allowed to have 4 mg in 100 ml of LiCl (concentration: 0.5 wt %) with DMAc as a solvent.

(2) Transmittance (Unit: %)

The transmittance of each of the films prepared in Examples and Comparative Examples was measured at 550 nm and 400 nm, by using a UV-Visible spectroscope (UV-1601 from Shimadzu) under analysis conditions of T %, recording range of 0 to 100, wavelength range (nm) of 700 to 300, fast scan speed and auto sampling interval (nm).

(3) Yellow Index

The Yellow index of each of the films prepared in the Examples and Comparative Examples was measured by using a Nippon Denshoku 300 instrument according to ASTM E313 standard.

(4) Viscosity

The viscosity was measured by using a Brookfield viscometer (Dv2TRV-cone&plate, CPA-52Z) at 25° C.

EXAMPLE 1

Molar Ratio of TFMB:CBDA:IPC=100:60:40

N,N-dimethylacetamide (DMAc) and 2,2'-bis(trifluoromethyl)benzidine (TFMB) were added to a reactor under a nitrogen atmosphere, and the mixture was thoroughly stirred. Then, cyclobutane tetracarboxylic dianhydride (CBDA) was added thereto and stirred well until dissolved. Then, isophthaloyl dichloride (IPC) was added thereto, and stirred for 6 hours, followed by dissolution and reaction, thereby preparing a polyamic acid composition. Here, contents of each monomer were the same as shown in composition ratios of Table 1 below, and a temperature of the reactor was maintained at 30° C. The prepared polyamic acid composition had a viscosity of 90,000 cps. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 310,000 g/mol.

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature, thereby forming a film on the glass substrate, and the film was separated from the substrate to obtain a polyamideimide film having a thickness of 68 μm.

EXAMPLE 2

Molar Ratio of TFMB:CBDA:IPC=100:50:50

N,N-dimethylacetamide (DMAc) and 2,2'-bis(trifluoromethyl)benzidine (TFMB) were added to a reactor under a nitrogen atmosphere, and the mixture was thoroughly stirred. Then, cyclobutane tetracarboxylic dianhydride (CBDA) was added thereto and stirred well until dissolved. Then, isophthaloyl dichloride (IPC) was added thereto, and stirred for 6 hours, followed by dissolution and reaction, thereby preparing a polyamic acid composition. Here, contents of each monomer were the same as shown in composition ratios of Table 1 below, and a temperature of the reactor was maintained at 30° C. The prepared polyamic acid composition had a viscosity of 77,000 cps. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 220,000 g/mol.

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature, thereby forming a film on the glass substrate, and the film was separated from the substrate to obtain a polyamideimide film having a thickness of 72 μm.

EXAMPLE 3

Molar Ratio of TFMB:CBDA:IPC=100:40:60

N,N-dimethylacetamide (DMAc) and 2,2'-bis(trifluoromethyl)benzidine (TFMB) were added to a reactor under a nitrogen atmosphere, and the mixture was thoroughly stirred. Then, cyclobutane tetracarboxylic dianhydride (CBDA) was added thereto and stirred well until dissolved. Then, isophthaloyl dichloride (IPC) was added thereto, and stirred for 6 hours, followed by dissolution and reaction, thereby preparing a polyamic acid composition. Here, contents of each monomer were the same as shown in composition ratios of Table 1 below, and a temperature of the reactor was maintained at 30° C. The prepared polyamic acid composition had a viscosity of 68,000 cps. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 180,000 g/mol.

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature, thereby forming a film on the glass substrate, and the film was separated from the substrate to obtain a polyamideimide film having a thickness of 57 µm.

EXAMPLE 4

Molar Ratio of TFMB:CBDA:IPC=100:30:70

N,N-dimethylacetamide (DMAc) and 2,2'-bis(trifluoromethyl)benzidine (TFMB) were added to a reactor under a nitrogen atmosphere, and the mixture was thoroughly stirred. Then, cyclobutane tetracarboxylic dianhydride (CBDA) was added thereto and stirred well until dissolved. Then, isophthaloyl dichloride (IPC) was added thereto, and stirred for 6 hours, followed by dissolution and reaction, thereby preparing a polyamic acid composition. Here, contents of each monomer were the same as shown in composition ratios of Table 1 below, and a temperature of the reactor was maintained at 30° C. The prepared polyamic acid composition had a viscosity of 48,000 cps. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 220,000 g/mol.

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature, thereby forming a film on the glass substrate, and the film was separated from the substrate to obtain a polyamideimide film having a thickness of 60 µm.

EXAMPLE 5

Molar Ratio of TFMB:CBDA:IPC=100:20:80

N,N-dimethylacetamide (DMAc) and 2,2'-bis(trifluoromethyl)benzidine (TFMB) were added to a reactor under a nitrogen atmosphere, and the mixture was thoroughly stirred. Then, cyclobutane tetracarboxylic dianhydride (CBDA) was added thereto and stirred well until dissolved. Then, isophthaloyl dichloride (IPC) was added thereto, and stirred for 6 hours, followed by dissolution and reaction, thereby preparing a polyamic acid composition. Here, contents of each monomer were the same as shown in composition ratios of Table 1 below, and a temperature of the reactor was maintained at 30° C. The prepared polyamic acid composition had a viscosity of 36,000 cps. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 160,000 g/mol.

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature, thereby forming a film on the glass substrate, and the film was separated from the substrate to obtain a polyamideimide film having a thickness of 62 µm.

EXAMPLE 6

Molar Ratio of TFMB:CBDA:IPC=100:10:90

N,N-dimethylacetamide (DMAc) and 2,2'-bis(trifluoromethyl)benzidine (TFMB) were added to a reactor under a nitrogen atmosphere, and the mixture was thoroughly stirred. Then, cyclobutane tetracarboxylic dianhydride (CBDA) was added thereto and stirred well until dissolved. Then, isophthaloyl dichloride (IPC) was added thereto, and stirred for 6 hours, followed by dissolution and reaction, thereby preparing a polyamic acid composition. Here, contents of each monomer were the same as shown in composition ratios of Table 1 below, and a temperature of the reactor was maintained at 30° C. The prepared polyamic acid composition had a viscosity of 38,000 cps. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 150,000 g/mol.

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature, thereby forming a film on the glass substrate, and the film was separated from the substrate to obtain a polyamideimide film having a thickness of 72 µm.

EXAMPLE 7

Molar Ratio of TFMB:CBDA:IPC=100:40:60

N,N-dimethylacetamide (DMAc) and 2,2'-bis(trifluoromethyl)benzidine (TFMB) were added to a reactor under a nitrogen atmosphere, and the mixture was thoroughly stirred. Then, cyclobutane tetracarboxylic dianhydride (CBDA) was added thereto and stirred well until dissolved. Then, isophthaloyl dichloride (IPC) was added thereto, and stirred for 6 hours, followed by dissolution and reaction, thereby preparing a polyamic acid composition. Here, contents of each monomer were the same as shown in composition ratios of Table 1 below, and a temperature of the reactor was maintained at 30° C. The prepared polyamic acid composition had a viscosity of 68,000 cps. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 180,000 g/mol.

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature, thereby forming a film on the glass substrate, and the film was separated from the substrate to obtain a polyamideimide film having a thickness of 30 µm.

Comparative Example 1

Molar Ratio of TFMB:6FDA:TPC=100:50:50

N,N-dimethylacetamide (DMAc) and 2,2'-bis(trifluoromethyl)benzidine (TFMB) were added to a reactor under a nitrogen atmosphere, and the mixture was thoroughly stirred. Then, 4,4'-hexafluoroisopropylidene diphthalic anhydride (6FDA) was added thereto and stirred well until dissolved. Then, terephthaloyl dichloride (TPC) was added thereto, and stirred for 6 hours, followed by dissolution and reaction, thereby preparing a polyamic acid composition. Here, contents of each monomer were the same as shown in composition ratios of Table 1 below, and a temperature of the reactor was maintained at 30° C. The prepared polyamic acid composition had a viscosity of 17,000 cps. Next, pyridine and acetic anhydride in a content of 2.5 times more than the content of 4,4'-hexafluoroisopropylidene diphthalic anhydride (6FDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 150,000 g/mol.

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature, thereby forming a film on the glass substrate, and the film was separated from the substrate to obtain a polyamideimide film having a thickness of 32 µm.

Comparative Example 2

Molar Ratio of TFMB:CBDA:IPC:6FDA=100:20:10:70

N,N-dimethylacetamide (DMAc) and 2,2'-bis(trifluoromethyl)benzidine (TFMB) were added to a reactor under a nitrogen atmosphere, and the mixture was thoroughly stirred. Then, 4,4'-hexafluoroisopropylidene diphthalic anhydride (6FDA) and cyclobutane tetracarboxylic dianhydride (CBDA) were added thereto and stirred well until dissolved. Then, isophthaloyl dichloride (IPC) was added thereto, and stirred for 6 hours, followed by dissolution and reaction, thereby preparing a polyamic acid composition. Here, contents of each monomer were the same as shown in composition ratios of Table 1 below, and a temperature of the reactor was maintained at 30° C. The prepared polyamic acid composition had a viscosity of 7,500 cps. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 80,000 g/mol.

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature, thereby forming a film on the glass substrate, and the film was separated from the substrate to obtain a polyamideimide film having a thickness of 31 µm.

Comparative Example 3

Molar Ratio of
TFMB:CBDA:IPC:6FDA=100:50:40:10

N,N-dimethylacetamide (DMAc) and 2,2'-bis(trifluoromethyl)benzidine (TFMB) were added to a reactor under a nitrogen atmosphere, and the mixture was thoroughly stirred. Then, 4,4'-hexafluoroisopropylidene diphthalic anhydride (6FDA) and cyclobutane tetracarboxylic dianhydride (CBDA) were added thereto and stirred well until dissolved. Then, isophthaloyl dichloride (IPC) was added thereto, and stirred for 6 hours, followed by dissolution and reaction, thereby preparing a polyamic acid composition. Here, contents of each monomer were the same as shown in composition ratios of Table 1 below, and a temperature of the reactor was maintained at 30° C. The prepared polyamic acid composition had a viscosity of 38,000 cps. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 120,000 g/mol.

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature, thereby forming a film on the glass substrate, and the film was separated from the substrate to obtain a polyamideimide film having a thickness of 30 μm.

Comparative Example 4

Molar Ratio of
TFMB:CBDA:6FDA:TPC=100:40:20:40

N,N-dimethylacetamide (DMAc) and 2,2'-bis(trifluoromethyl)benzidine (TFMB) were added to a reactor under a nitrogen atmosphere, and the mixture was thoroughly stirred. Then, 4,4'-hexafluoroisopropylidene diphthalic anhydride (6FDA) and cyclobutane tetracarboxylic dianhydride (CBDA) were added thereto and stirred well until dissolved. Then, terephthaloyl dichloride (TPC) was added thereto, and stirred for 6 hours, followed by dissolution and reaction, thereby preparing a polyamic acid composition.

Here, the temperature of the reactor was maintained at 30° C., and the monomers were added according to the composition ratios shown in Table 1 below. The prepared polyamic acid composition had a viscosity of 57,000 cps.

The polyamic acid composition was precipitated with 20 L of methanol, and the precipitated solid was filtered and pulverized and dried at 100° C. under vacuum for 4 hours to obtain polyamideimide powder. Here, a resin according to the polyamideimide powder had a weight average molecular weight of 190,000 g/mol.

12 g of the obtained polyamideimide powder was dissolved in 88 g of N,N-dimethylacetamide (DMAc), and then, film formation was performed on a glass substrate using an applicator. Then, the resultant product was heat-treated in a vacuum oven at 100° C. for 30 minutes, at 200° C. for 30 minutes, and at 250° C. for 30 minutes, and then cooled at room temperature, thereby forming a film on the glass substrate, and the film was separated from the substrate to obtain a polyamideimide film having a thickness of 30 μm.

TABLE 1

| | Composition ratio (Molar ratio) | | | | | Light transmittance (%) | | Transmittance ratio Tr_400 nm/ Tr_550 nm | Thickness (μm) | Yellow index |
|---|---|---|---|---|---|---|---|---|---|---|
| | TFMB | CBDA | IPC | 6FDA | TPC | 550 nm | 400 nm | | | |
| Example 1 | 100 | 60 | 40 | — | — | 89.3 | 86.9 | 0.97 | 68 | 2.4 |
| Example 2 | 100 | 50 | 50 | — | — | 89.6 | 86.3 | 0.96 | 72 | 1.8 |
| Example 3 | 100 | 40 | 60 | — | — | 89.5 | 87.1 | 0.97 | 57 | 1.6 |
| Example 4 | 100 | 30 | 70 | — | — | 89.5 | 87.2 | 0.97 | 60 | 1.7 |
| Example 5 | 100 | 20 | 80 | — | — | 89.6 | 86.9 | 0.97 | 62 | 1.7 |
| Example 6 | 100 | 10 | 90 | — | — | 89.4 | 86.8 | 0.97 | 72 | 1.9 |
| Example 7 | 100 | 40 | 60 | — | — | 89.6 | 87.2 | 0.97 | 30 | 1.5 |
| Comparative Example 1 | 100 | — | — | 50 | 50 | 89.3 | 80.6 | 0.90 | 32 | 2.3 |
| Comparative Example 2 | 100 | 20 | 10 | 70 | — | 89.9 | 83.3 | 0.92 | 31 | 2.0 |
| Comparative Example 3 | 100 | 50 | 40 | 10 | — | 88.9 | 83.9 | 0.94 | 30 | 2.0 |
| Comparative Example 4 | 100 | 40 | — | 20 | 40 | 88.4 | 82.4 | 0.93 | 30 | 2.4 |

It could be confirmed from Table 1 that all of Examples according to the present disclosure showed high light transmittance at both long wavelength (550 nm) and short wavelength (400 nm) regions, while simultaneously showing excellent Yellow index (YI index). In particular, it could be confirmed that the films of Examples 2 to 7 included the IPC content of 50 to 90 moles based on 100 moles of TFMB, and had the Yellow index which was much lower than the film including the IPC content of 40 moles like Example 1. On the other hand, Comparative Examples 1 to 4 which included the aromatic dianhydride had remarkably lowered transmittance as shown at 400 nm. As a result of confirming a transmittance ratio of a transmittance in a light having a wavelength of 400 nm to a transmittance in a light having a wavelength of 550 nm, the transmittance ratios of Comparative Examples 1 to 4 were 0.90 to 0.94, which were significantly lower than those of Examples of the present disclosure. In addition, the Yellow index of each of Comparative Examples was higher than those of Examples. That is, it could be confirmed that Examples according to the present disclosure could implement excellent light transmittance not only at a long wavelength region but also a short wavelength region of 400 nm, while simultaneously implementing a low Yellow index.

The polyamideimide film prepared from the polyamic acid composition according to the present disclosure may implement high transmittance, a low Yellow index, and excellent surface hardness while maintaining inherent and excellent physical properties such as mechanical, heat and electrical properties. In particular, since the polyamideimide film has generally and significantly excellent light transmittance in a wide range throughout the visible light region including not only a long wavelength region but also a short wavelength region, thereby remarkably improving optical properties, subsequently, the polyamideimide film is able to be applied to various display fields.

Hereinabove, although the present disclosure is described by specific matters, limited exemplary embodiments, and drawings, they are provided only for assisting in the entire understanding of the present disclosure. Therefore, the present disclosure is not limited to the exemplary embodiments. Various modifications and changes may be made by those skilled in the art to which the present disclosure pertains from this description.

Therefore, the sprit of the present disclosure should not be limited to the above-described exemplary embodiments, and the following claims as well as all modified equally or equivalently to the claims are intended to fall within the scopes and spirits of the disclosure.

What is claimed is:

1. A polyamideimide film derived from 2,2'-bis(trifluoromethyl)benzidine, cyclic aliphatic dianhydride, and aromatic diacid dichloride, and satisfying Equation 1 below:

$$(Tr\_400 \text{ nm}/Tr\_550 \text{ nm}) \geq 0.96 \qquad \text{[Equation 1]}$$

wherein Equation 1 represents a transmittance ratio of a transmittance in a light having a wavelength of 400 nm to a transmittance in a light having a wavelength of 550 nm, Tr_400 nm is a transmittance at 400 nm, and Tr_550 nm is a transmittance at 550 nm, wherein the polyamide film has a Yellow index of 2.4 or less.

2. The polyamideimide film of claim 1, wherein the transmittance at 400 nm of the polyamideimide film is 85% or more.

3. The polyamideimide film of claim 1, wherein the cyclic aliphatic dianhydride is cyclobutane tetracarboxylic dianhydride, and the aromatic diacid dichloride is isophthaloyl dichloride.

4. The polyamideimide film of claim 1, wherein the aromatic diacid dichloride has a content of 40 to 90 moles with respect to 100 moles of the 2,2'-bis(trifluoromethyl)benzidine.

5. A polyamideimide film derived from components consisting of 2,2'-bis(trifluoromethyl)benzidine, cyclic aliphatic dianhydride, and isophthaloyl dichloride.

6. The polyamideimide film of claim 5, wherein the isophthaloyl dichloride has a content of 40 to 90 moles with respect to 100 moles of the 2,2'-bis(trifluoromethyl)benzidine.

7. The polyamideimide film of claim 5, wherein the polyamideimide film satisfies Equation 1 below:

$$(Tr\_400 \text{ nm}/Tr\_550 \text{ nm}) \geq 0.96 \qquad \text{[Equation 1]}$$

wherein Equation 1 represents a transmittance ratio of a transmittance in a light having a wavelength of 400 nm to a transmittance in a light having a wavelength of 550 nm, Tr_400 nm is a transmittance at 400 nm, and Tr_550 nm is a transmittance at 550 nm.

8. The polyamideimide film of claim 7, wherein the transmittance at 400 nm of the polyamideimide film is 85% or more.

9. The polyamideimide film of claim 5, wherein the polyamideimide film has a Yellow index of 2.4 or less.

10. The polyamideimide film of claim 5, wherein the cyclic aliphatic dianhydride is cyclobutane tetracarboxylic dianhydride.

11. The polyamideimide film of claim 10, wherein the isophthaloyl dichloride has a content of 40 to 90 moles with respect to 100 moles of the 2,2'-bis(trifluoromethyl)benzidine.

* * * * *